April 27, 1937. W. F. HUCK 2,078,633
BANDING MACHINE
Filed Sept. 22, 1934 9 Sheets-Sheet 2

INVENTOR.
William F. Huck
by Albert J Horton
ATTY.

April 27, 1937.  W. F. HUCK  2,078,633
BANDING MACHINE
Filed Sept. 22, 1934  9 Sheets-Sheet 5

INVENTOR.
William F. Huck
by Albert J. Horton
ATTY.

April 27, 1937.　　　W. F. HUCK　　　2,078,633
BANDING MACHINE
Filed Sept. 22, 1934　　　9 Sheets-Sheet 7

INVENTOR.
William F. Huck
By Albert J. Horton
ATTY.

April 27, 1937.  W. F. HUCK  2,078,633
BANDING MACHINE
Filed Sept. 22, 1934  9 Sheets-Sheet 9

INVENTOR.
William F. Huck
by Albert J. Horton
ATTY

Patented Apr. 27, 1937

2,078,633

UNITED STATES PATENT OFFICE 2,078,633

BANDING MACHINE

William F. Huck, Richmond Hill, N. Y., assignor, by mesne assignments, to R. Hoe & Co., Inc., New York, N. Y., a corporation of New York Application September 22, 1934, Serial No. 745,021

27 Claims. (Cl. 93—93)

This invention relates to a banding machine and more particularly to a machine for use in wrapping and securing strips of banding material around a plurality of packs of cut products.

The said invention generally comprises a machine which is adapted to receive a plurality of packs of cut products in a side by side relation, which packs are adapted to be forwarded to banding mechanism where each pack will have a strip of banding material wrapped about it and secured. The arrangement is such that packs are delivered to this machine in quantities which outnumber the banding members two to one and when received, are arranged in a single transverse row in side by side relation. Said packs are received by gripper members which are adapted to advance them to suitable guide tracks. During this movement the grippers are moved into two transverse rows in a leading and following relation, while the packs are swung to positions which will bring the packs of one row into substantial longitudinal alignment with the packs of the other row. Two rows of packs, having thus been deposited on the tracks are next forwarded one row at a time to the banding mechanism by means of reciprocating pusher members.

The banding mechanism generally comprises means for presenting a cut strip of banding material in the path of an approaching pack, so that it may be engaged by said pack and inserted therewith in one of two pack receiving clips on a rotatable block member, to partially wrap the pack. An adhesive applying member is adapted to apply adhesive to a portion of the banding strip, after which the block is rotated to further wrap the band around same and bring the pack to an ejecting position. An ejector finger on the said pusher next engages said partially wrapped pack and forces the same through guide members which causes the pack to be finally wrapped and the ends of the band sealed. The pusher fingers are arranged to move one pack into a clip while another pack is moved out of a clip.

On object of the invention is to provide means to receive packs of cut products for delivery to banding members in which the said receiving means outnumber the banding members two to one.

Another object is to provide a means of operation whereby said pack receiving means are adapted to receive packs of cut products in a single transverse row in side by side relation, which upon advancing toward the banding members will be separated into two transverse rows in a leading and following relation with the number of packs in each row equalling the number of banding members.

Another object is to provide means for independently actuating each pack receiving means at the time the packs are being separated into two rows, which means will adjust the position of each pack to bring the packs in one row into substantial longitudinal alignment with the packs in the other row.

Another object is to provide a reciprocating pusher means which is adapted to advance each of the two rows of packs to the banding mechanism intermittently while the pack receiving means receives, delivers and returns again to a receiving position.

Another object is to provide an intermittently rotatable member with pack receiving clips, which is adapted to cooperate with a banding strip feeding and cutting mechanism, to apply a banding strip to each pack, and to further provide an adhesive applying means and guide means to complete the wrapping of a band around the pack and secure same.

It is also an object to provide a banding machine of generally improved construction, whereby the device will be simple, durable and inexpensive in construction as well as convenient, practical, serviceable and efficient in its use.

With the foregoing and other objects in view which will appear as the description proceeds the invention resides in the combination and arrangement of parts and in the details of construction hereinafter described.

The preferred embodiment of the invention is shown in the accompanying drawings, in which.

The machine generally comprises a base 20 upon which two upwardly extending side walls 21—21 are mounted. A main drive shaft 22 suitably mounted in bearings in the side walls 21—21 is continuously driven from any desirable source but preferably through a connection with the drive of the machine from which the product is received as indicated by the drive 23, in Figure 3. An intermittent drive shaft 24, also extending between the walls 21—21 and beyond the ends thereof, is mounted in suitable bearings in said walls and is driven by means of a Geneva motion obtained through a slotted disc 25, said disc having slots 26 therein, which are adapted to be engaged by rollers 27—27 mounted on the outer ends of diametrically opposed arms 28—28 projecting from a hub secured to the main drive shaft 22. Five slots 26 are provided in said disc 25, therefore, upon the engagement of a roller with one of said slots 26, the intermittent shaft 24 will be moved one fifth of a revolution and since the two diametrically opposed rollers 27—27 will pass through two of the slots in said disc upon each revolution of the main drive shaft 22, the intermittent drive shaft 24 will move twice or two fifths of a revolution.

Gripper mechanism is provided, as best shown in Figures 2, 4, 7 and 11, which includes a plurality of vertically disposed gripper members all of which are adapted to be rotated about their vertical axes and are alternately mounted within bearing blocks 29 provided on two independently movable cross beams, an outer beam 31 and an inner beam 31a.

Figure 2:
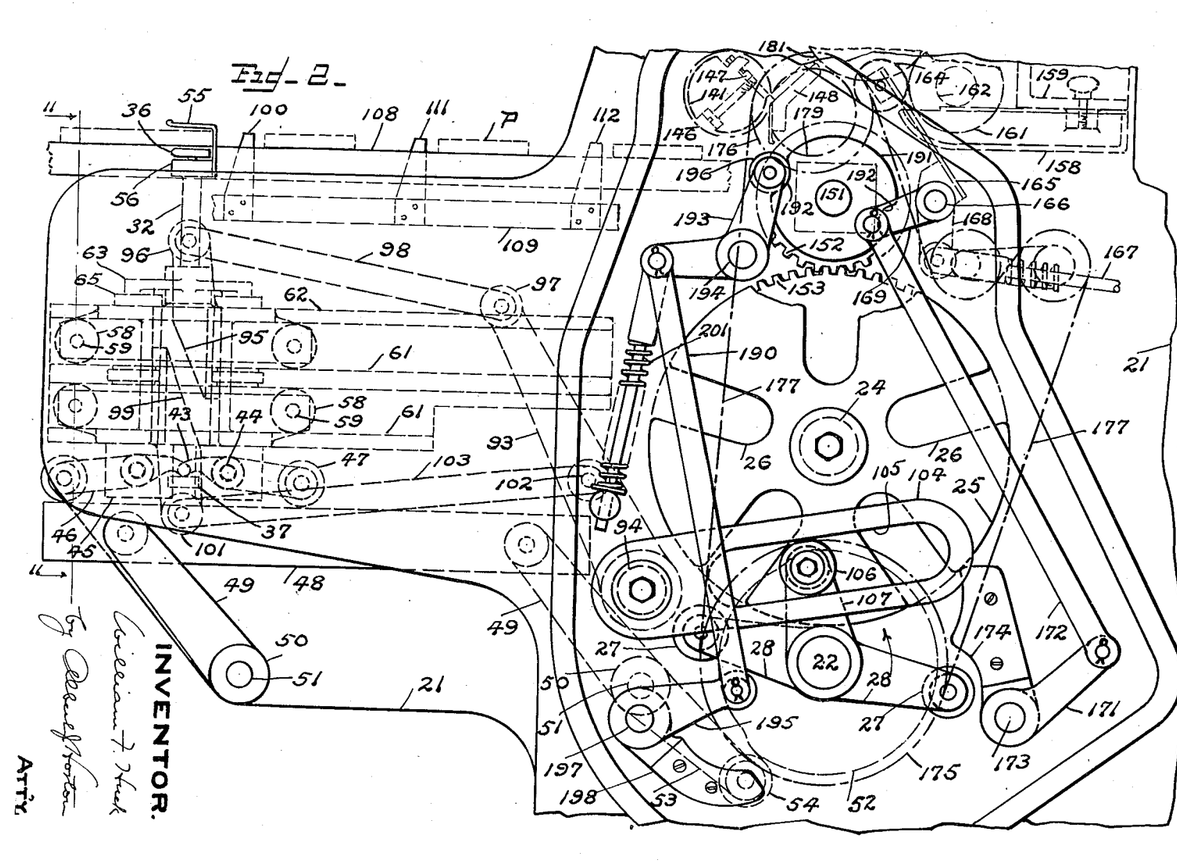
Figure 2 is an enlarged side elevational view of the machine with parts broken away and looking at the side opposite that shown in Figure 1.
Figures 7, 8:
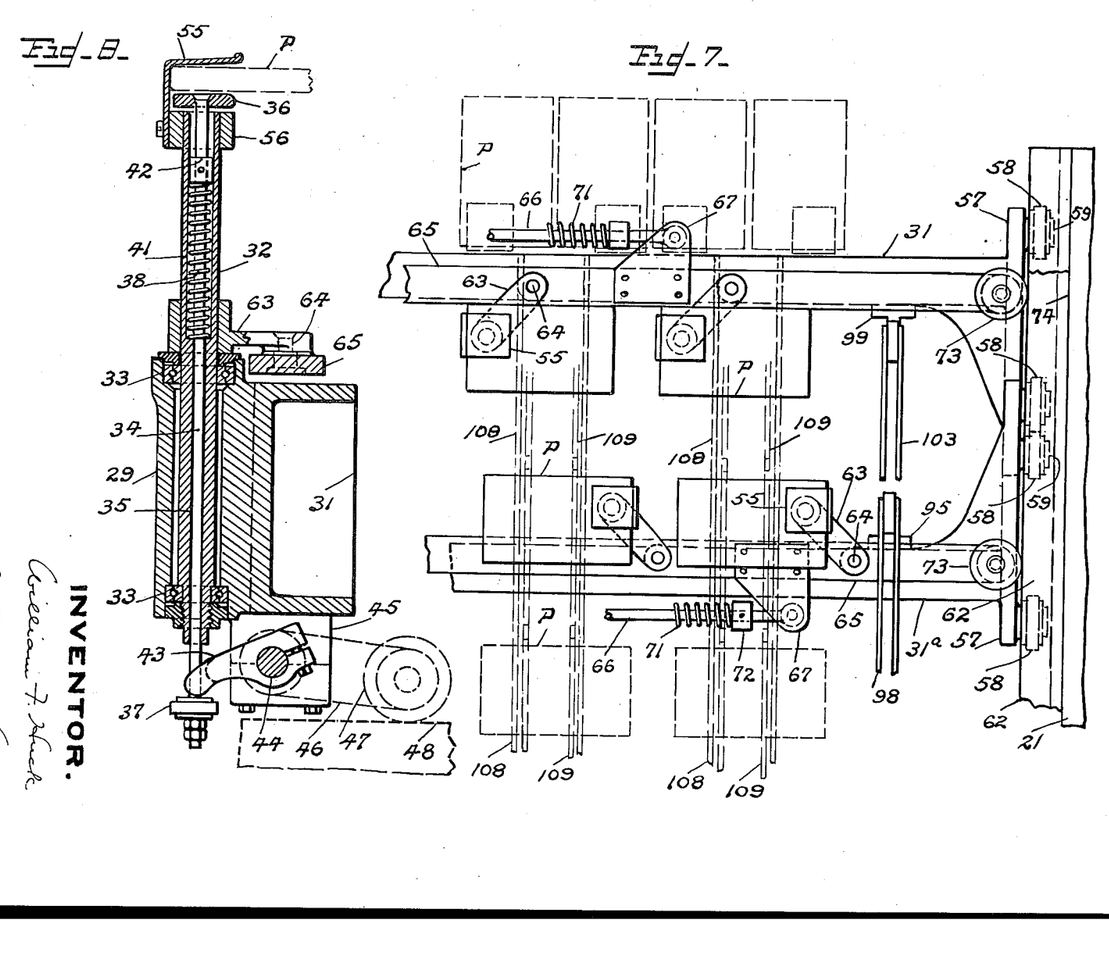
Figure 7 is a fragmentary plan view showing the position of the packs after they have been separated and transferred from the pack receiving position, of Figure 4, to the double row position, where they are ready to be advanced in a leading and following relation to the banding mechanism.
Figure 8 is a vertical sectional detail view through one of the gripper members taken on the line 8—8 of Figure 4.

As best shown in Figure 8, each gripper member comprises a vertically disposed shaft 32 rotatably mounted in bearings 33—33 secured within the bearing blocks 29. A rod 34 extends through a vertical clearance opening 35 in said shaft 32 and has a pad 36 at the upper end thereof and an adjustable collar 37 located at its lower end. By means of a spring 38, located in a counterbore 41 in the upper end of the shaft 32 and engaging a sleeve 42 fixed to said rod, the said rod is normally pushed upward but its movement is restricted through the engagement of a stop arm 43 with the upper surface of the collar 37. Said stop arm is adjustably positioned on a transverse rock shaft 44 suitably supported in bearings 45 along the lower end of a cross beam. The rock shaft 44 is prevented from rotating about its axis by means of an arm 46 which is secured at one end thereto, said arm having a roller 47 mounted on its free end which is maintained in engagement with a bar 48 as best shown in Figures 2 and 8. Said bar 48 is supported on two levers 49—49 each of which has a hub 50 (Figures 2 and 3) pivotally mounted on studs 51, fixed within one of the side walls 21, which bar is adapted to be moved downward or upward through the action of a cam 52 on the drive shaft 22 and the engagement therewith of a cam roller 54 on an arm 53, extending from one of the hubs 50. Hence when the roller 54 is riding on the high surface of the cam 52, the rod 34 is held in a retracted position by the action of the stop arm 43 and when the roller 54 moves to the lower surface of the cam the stop arm 43 will rock upward and permit the rod 34 to be moved upward by the pressure of the spring 38. A gripper plate 55 is secured to a collar 56 at the upper end of the gripper shaft 32 (Figure 8), and has a portion thereof extending directly over and in spaced relation to the pad 36, thus providing a mouth within which a product or pack P may be received, as indicated in dotted lines in Figure 8. It will be observed that when each pack is conveyed to a gripper, the pad 36 thereof will be in its lowermost position, but after receiving the pack, the stop arm 43 will swing upward to permit the pad to be pressed against the lower surface of the pack by the action of the spring 38 and thus clamp same against the plate 55.

Figure 4:
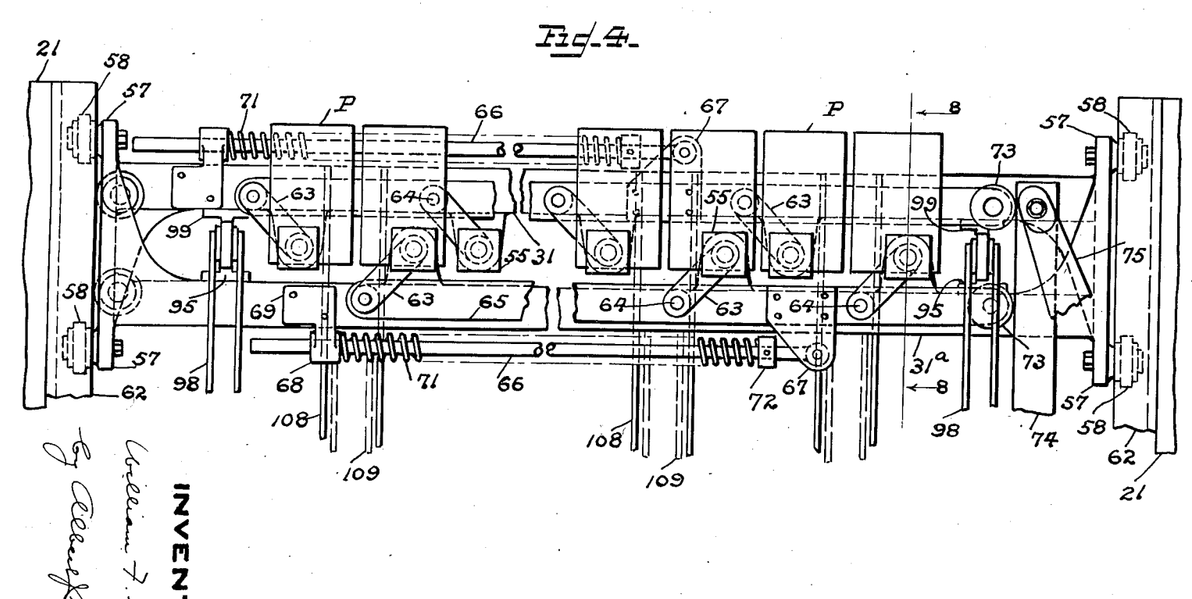
Figure 4 is an enlarged plan view, with parts broken away, of the pack receiving mechanism, showing the packs of cut products arranged in their grippers in a normal receiving position.
Figure 11:
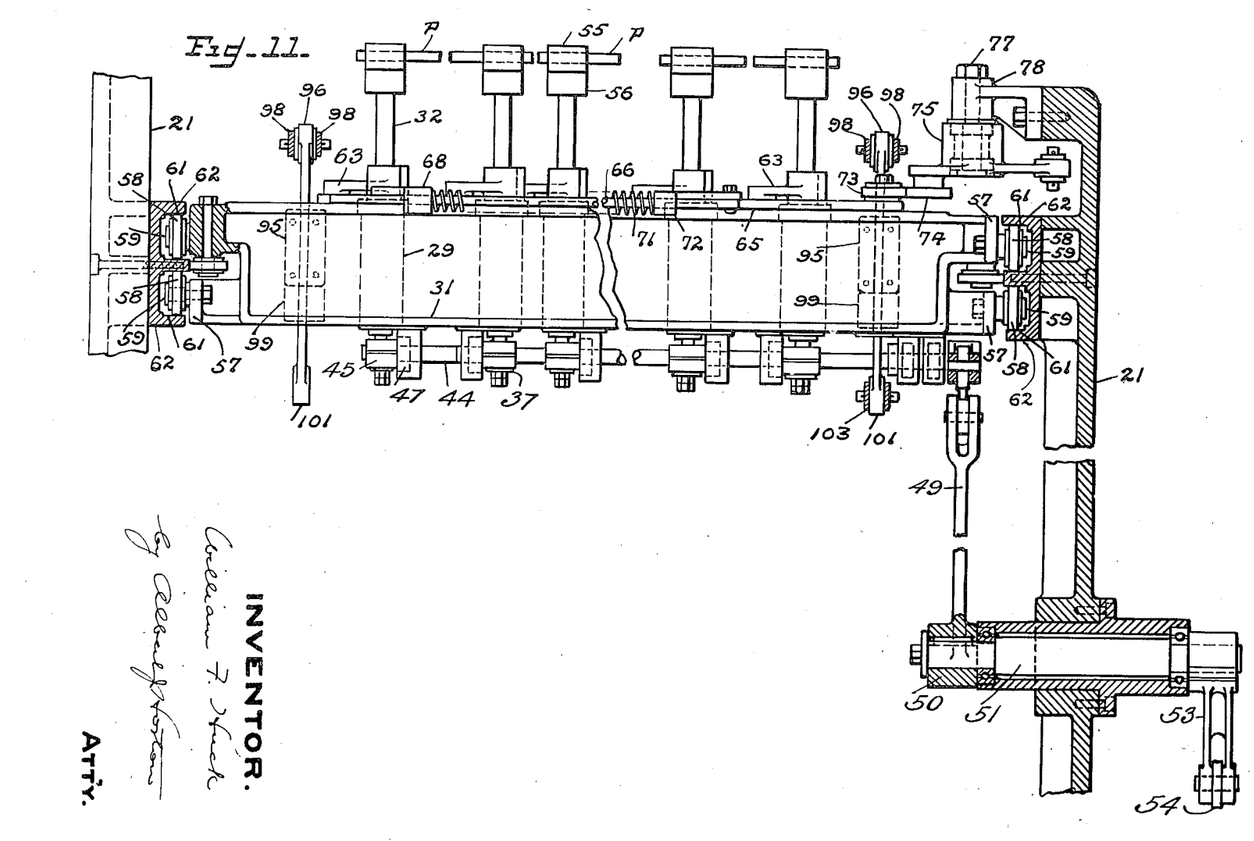
Figure 11 is a vertical cross-sectional view with parts in elevation, taken along the line 11—11 of Figure 2.

Assuming that the packs have been conveyed to the grippers, the relative position of said packs would be as shown in Figure 4, with each gripper preferably holding a pack near one corner thereof, and arranged so that alternate packs are engaged by the grippers on one beam 31, while the remaining alternate packs are engaged by the grippers on the other beam 31a. After receiving the packs as shown in Figure 4, the next operation is to separate the beams 31—31a while the same are also moved forward, and further to rotate each gripper around the axes of their vertical shafts 32, to swing the packs carried by each gripper so that the packs may be arranged in two rows with their wider sides foremost as shown in Figure 7. To provide for this condition each cross beam 31—31a is provided with end flanges 57—57 arranged on the upper and lower portions of the beams respectively, and two rollers 58—58 are rotatably mounted on studs 59—59 secured within each of said flanges. See Figures 4 and 11. Two parallel horizontal trackways 61—61 are provided in each of a pair of racks 62—62, secured to the inner sides of each of the side walls 21—21, within which the rollers 58 are adapted to run. As best shown in Figures 4, 8 and 11, each vertical gripper shaft 32 has a lever 63 secured thereto which levers normally extend outward therefrom in an angularly disposed direction and have their outer ends pivotally joined, through pivot studs 64, to one of two bars 65—65 arranged in parallel relation to each other and to the cross beams 31—31a.

Rollers 73, best shown in Figure 4, are rotatably mounted at the extended ends of each of said bars 65—65, and spring actuated means is provided for each bar to maintain the said rollers 73 in engagement with a movable stop bar 74, which stop bar controls the position of the levers 63 and the packs P when they are supported by the grippers. Each spring actuated means includes a rod 66 pivotally joined to a plate 67, extending from the bar 65, and is slidable endwise within a bearing 68 on a bracket 69, which bracket is secured to a cross beam 31 or 31a. A spring 71 is compressed between the bearing 68 and a collar 72 on said rod. While only one of said spring actuated means is described, it will be understood that there will be one for each of the bars 65.

Figure 1:
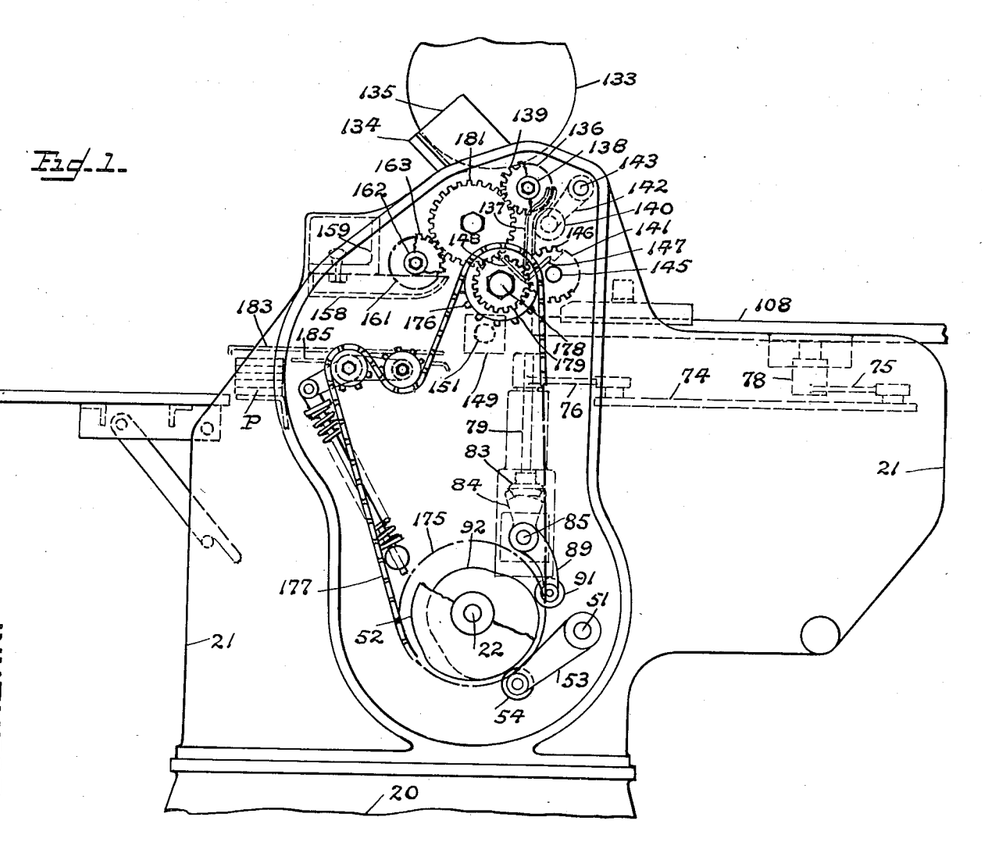
Figure 1 is a side elevational view of the machine in general.
Figure 5:
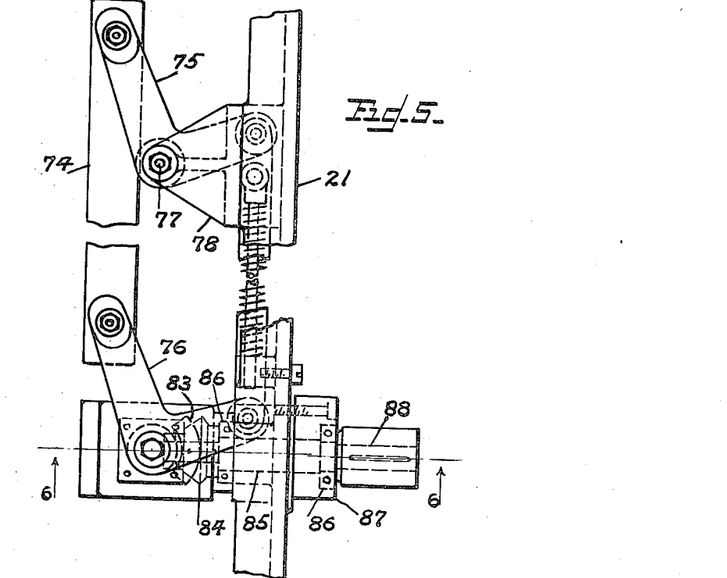
Figure 5 is a fragmentary plan detail view, with parts broken away, showing the gripper shifting member.
Figure 6:
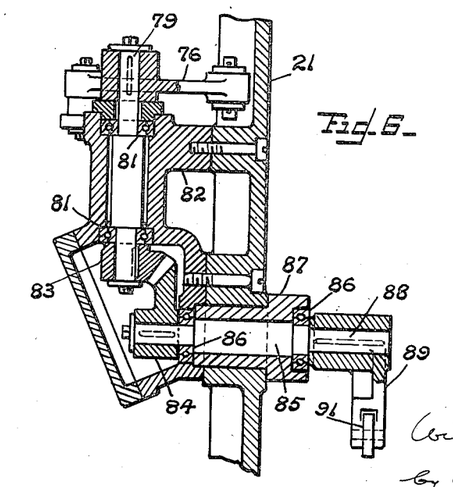
Figure 6 is a vertical sectional view taken along the line 6—6 of Figure 5.

The stop bar 74 is carried at one end of each of two bell cranks 75 and 76 shown in Figure 5. One bell crank 75 is pivotally mounted on a stud 77 supported in a bearing bracket 78 on one side wall 21 as shown in Figures 5 and 11. The other bell crank 76 is fixed to a vertically disposed shaft 79, which shaft is rotatably mounted in suitable bearings 81 provided in a bracket 82 also secured to the side wall 21. A bevel gear segment 83 is fixed to the lower end of said shaft 79 and meshes with another bevel gear segment 84 on a horizontally disposed shaft 85, which shaft is rotatable in suitable bearings 86 provided in said bracket 82, and in a sleeve 87 in the wall 21. Said shaft 85 has a reduced end portion 88 extending beyond the exterior of the wall 21 on which a cam actuated arm 89 is fixed, and said arm has a roller 91 rotatably mounted at its outer end which rides over the outer cam surface of a cam 92, located on the main drive shaft 22 as shown in Figure 1. Said cam 92 is provided with one high and one low actuating surface which will rock the arm 89 and shaft 85 and the cooperating vertical shaft 79 with its bell crank 76, once for each revolution of the main drive shaft 22. The rocking motion will thus actuate the bell cranks 75 and 76 to move the bar 74 from the position shown in Figure 4 to the position of Figure 7. The rollers 73—73 on the spring impelled bars 65—65 will remain in engagement with the bar 74, which will thus cause the said bars 65—65 to move and partially rotate each gripper shaft 32 through the rocking movement of the levers 63 connected to the said gripper shaft 32 and bars 65—65. During the partial rotation of the gripper shafts, the packs are moved about the axes of the shafts 32 to bring the longer sides of each pack forward as shown in Figure 7.

Figure 3:
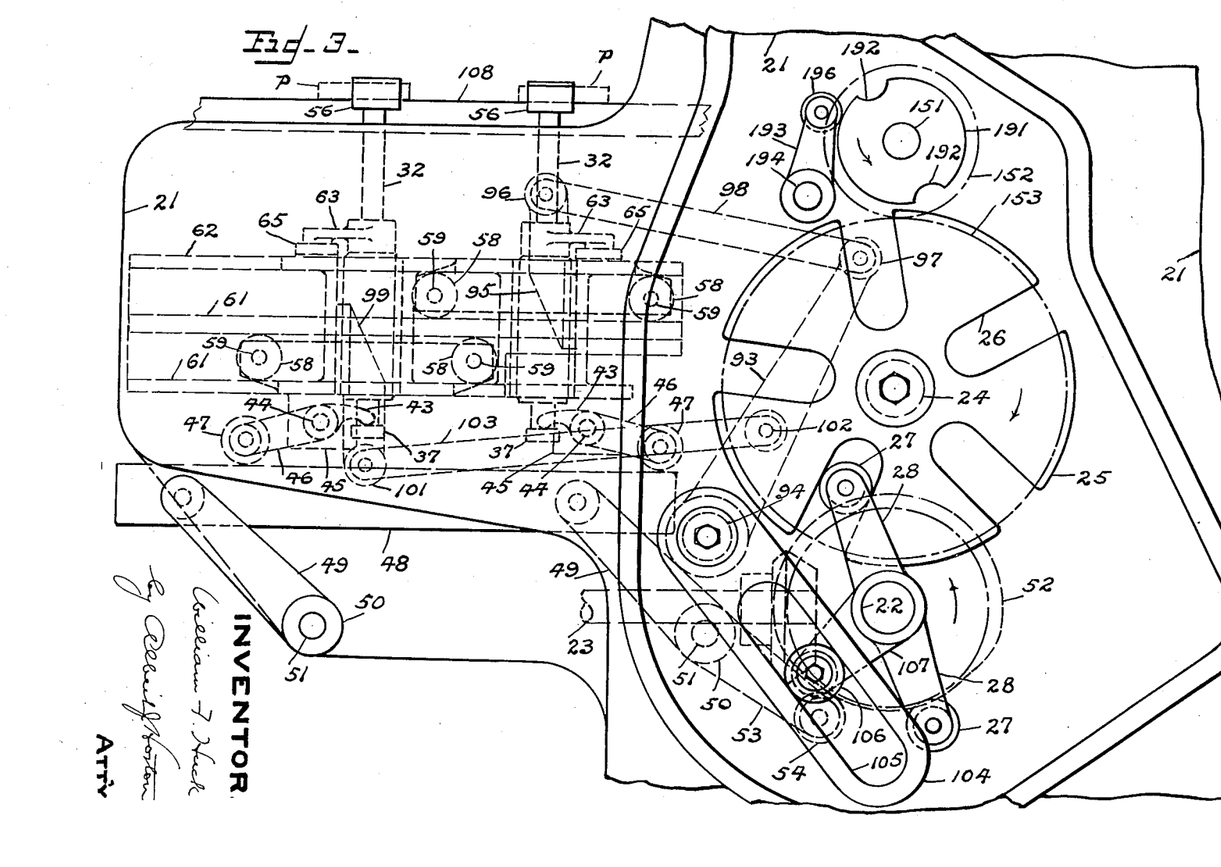
Figure 3 is a view similar to that shown in Figure 2 but with the mechanism shown in a different position.

At the same period during which the packs are being moved, the inner cross beam 31a will be moved away from the outer cross beam 31 to provide sufficient space for the free turning movement of the packs, and said outer cross beam will move simultaneously therewith but at a slower speed in order to deposit the outer packs in a position out of the path of the next succeeding row of packs in the receiving position. The structure provided to move said cross beams is best shown in Figures 2, 3 and 4 and includes a pair of rocker arms 93—93 fixed to a shaft 94, extending between the walls 21—21 and rotatably mounted in suitable bearings within said walls. Two brackets 95—95 are secured to the inner cross beam 31a near the ends thereof and have upwardly extended ends 96—96 which are joined with outwardly extended ends 97—97 of the rocker arms 93—93 by means of links 98—98. The outer cross bar 31 also has two brackets 99—99 secured thereto, and said brackets have downwardly extended ends 101—101 which are joined to said rocker arms 93—93 at 102—102 by means of links 103—103 (Figures 3 and 7). It will be observed that the links 103—103 are in a much lower position on the rocker arms 93—93 than the links 98—98. Therefore the arc through which the link connecting point 97 will move, will be greater than the arc through which the link connecting point 102 will move. Hence, while both cross beams will be moved inward simultaneously when the roller arm is moved inward, the inner cross beam will move the greater distance and the space between the two cross beams will increase proportionally throughout the length of the inward stroke.

The means provided to rock the rocker arms 93, 93 includes an operating arm 104, fixed to an extended end of the shaft 94, and having an elongated slot 105 therein, which slot is engaged by a roller 106 carried by an arm 107, said arm being fixed to the main drive shaft 22. The arm 107 will rotate with the shaft 22 and will cause the operating arm 104 to be rocked from the position shown in Figure 2 to the position shown in Figure 3, then return to its original position. The cross beams 31—31a are thus given a continuous reciprocating motion which, in cooperation with the aforesaid gripper operating mechanism will move the packs P from the receiving position in which they are shown in a single row in Figures 2 and 4, to a deposited position indicated by the double row in full lines of Figure 7. Track members 108, running in pairs longitudinally of the machine, are provided beneath the packs so that the said packs may be supported after they are released from their gripper members, and said tracks are suitably supported on cross bars arranged between the walls 21—21.

After the packs are deposited on their respective track members 108, and while the grippers are returning to receive the next group of packs, reciprocating pusher means is actuated which is adapted to engage each of said packs and advance both rows simultaneously along the track members, while the leading row is moved to a banding position. As shown in Figures 2, 7, 9 and 10, said reciprocating pusher means include two bars 109 having offset portions 110 which are positioned directly beneath the tracks 108 and have three pusher fingers 100, 111, 112 thereon, and one ejecting finger 113 on the offset portion, as clearly shown in Figure 10. Each bar 109—110 is supported on angle cross members 120, (Figures 9 and 10),—each cross member, in its length, is provided with a series of upturned lugs 120a which serve as the supports for the various bars 109—110. The lugs 120a in turn serve as the connection between the said supporting bars 120 and the link members 116—116a. Said links 116—116a are further secured to the arms 114 of the bell cranks 115, which are fixed to the shafts 117 and 118, said shafts being rotatably mounted in suitable bearings in the side walls 21—21. Another link 119 is connected to the downwardly extending arms 121—121 of said bell cranks 115—115.

A cam actuated arm 122 is fixed on an outwardly extending end of the shaft 117 and has a cam roller 123 at the outer end thereof which rides over the cam surface of a cam 124 on the main drive shaft 22. Said cam 124 is provided with a cam surface which is adapted to rock the bell crank shaft 115 in one direction and return twice during each rotation of the main drive shaft and thereby move the pusher bars downward at the end of a forward stroke of said bars, and upward at the end of the return stroke of the bars twice, while the gripper mechanism completes one cycle of movement.

The actuating means for moving the pusher bars forward and backward to advance the packs to a banding position, includes a cam arm 125, fixed to a shaft 126 which is rotatably mounted in suitable bearings in the side walls 21—21, said cam arm having a roller 127 at its outer end, which rides over the cam surface of a cam 128 on the main drive shaft 22. A number of levers 129 are provided on the shaft 126, each of which is connected with an arm 131 of the bell crank 116a by means of links 132. As the cam 128 rotates, the lever 129 will be rocked twice through the action of the cam arm 125 and will rock the bell crank 116a about its pivotal connection with arm 114 of the bell crank 115, to thereby cause the pusher bars 109 to be reciprocated forward and backward. The bell cranks 115—115 will thus function in two ways, one to provide substantial supporting pivots at the ends of the arms 114—114, about which the links 116 and bell cranks 116a are permitted to swing and the other to move said pivotal points downward while the pusher bars 109 are in motion, to permit the pusher fingers to pass below the advanced packs on the return stroke of the said pusher bars, then move up into the path of the packs at the rear thereof on the forward stroke to further advance same.

As previously stated, the pusher bars will move through their cycle twice while the gripper mechanism moves through its cycle once, the reason being to advance each of the two rows of packs to a banding position before the gripper mechanism deposits two additional rows of packs on the tracks for the pusher bars to advance in the same manner.

Up to this point the description has related to the mechanism for removing the packs from a gripper receiving position to the banding position. Now the banding mechanism and its operation will be described.

Figures 12, 13:
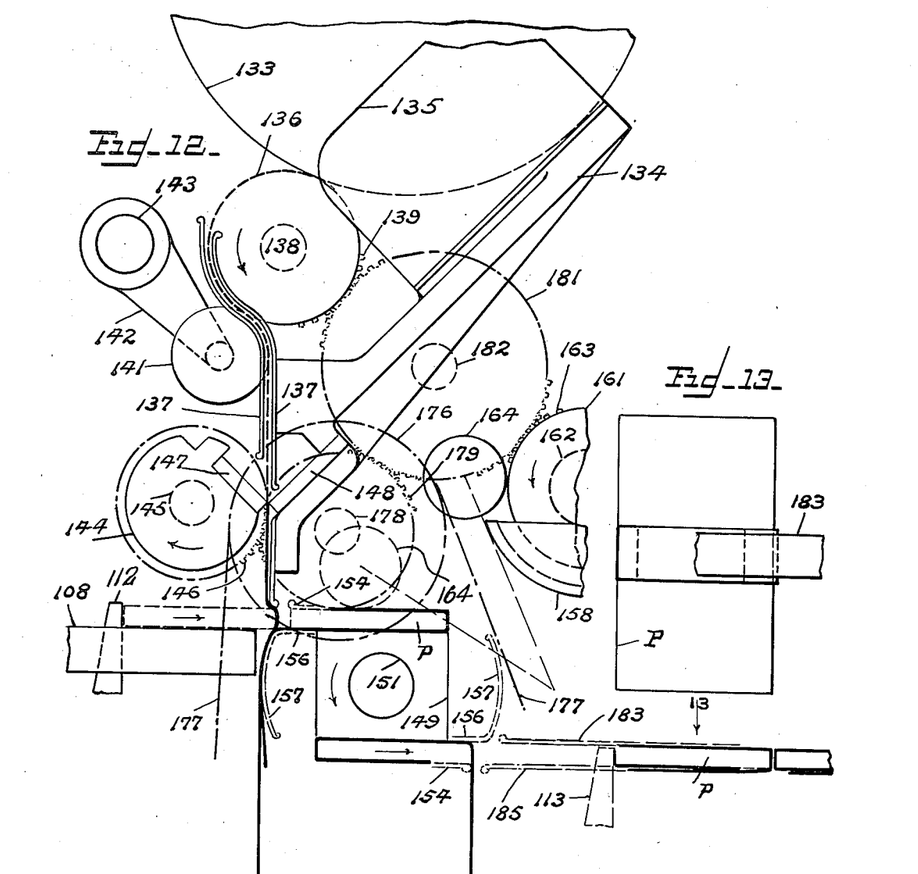
Figure 12 is a diagrammatic view generally showing the banding mechanism, including adhesive applying means and band applying and wrapping means.
Figure 13 is a plan view of a wrapped pack as seen from the direction of the arrow in Figure 12.

As best shown in Figure 12, a roll of banding material or tape 133 is provided for each of the rows of cards advanced by the pushers 134 mounted in a support 134, which extends transversely across the upper portion of the machine and is secured at its ends to the side walls 21—21. Each banding roll is further guided between guide plates 135 secured to said support 134 and rests upon an unwinding roller 136, the banding strip being drawn from the bottom of the roll and passing over the roller 136. Said banding strip is then guided between guide plates 137—137 in a vertically downward direction, directly into the path of an approaching pack. The unwinding rollers 136 are fixed to a driven shaft 138, which shaft is rotatably mounted in suitable bearings in the side walls 21—21 and has gears 139 at one end thereof. A number of pressure rollers 141 are rotatably mounted on arms 142 and said arms are adjustably mounted on a shaft 143 supported between the side walls 21—21. Each pressure roller is positioned so as to engage its associated banding strip along the lower position of the unwinding roller 136 to apply a pressure thereto and to assure the continuous feed of said banding strip.

Rotary cutting members 144 are provided to shear the banding material into strips of the desired lengths, which cutting members are fixed to a driven shaft 145, said shaft being rotatably mounted in suitable bearings in the side walls 21—21 and having a gear 146 at one end thereof. A knife plate 147 is secured to each cutter member, which plates are adapted to cooperate with other knife plates 148 mounted on the support 134.

Figure 14:
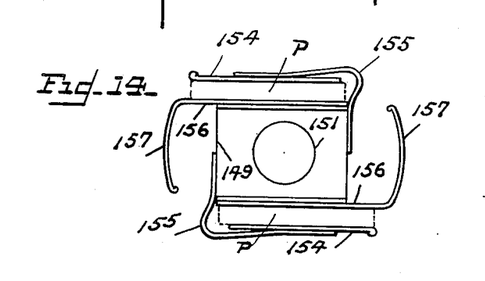
Figure 14 is a detail side elevational view of the rotatable block member with pack receiving clips thereon.

A rotatable pack wrapping fixture is provided for each row of advancing packs as shown in Figures 12 and 14, each of which comprises a block 149 fixed on a shaft 151, rotatably mounted in suitable bearings in the side walls 21—21. Said shaft has a pinion 152 mounted on the outer end thereof as shown in Figure 2, which meshes with a gear 153 secured to and rotatable with the Geneva disc 25. On two diametrically opposite sides of said block, a flexible pack receiving clip is provided which comprises an outer strap 154, supported by a flexible arm 155 secured to the block 149. Another strap 156 secured to one side of the block 149, has one extended end bent back as shown at 157. Each of said clips are adapted to be moved with the block to a pack receiving and ejecting position as shown in Figure 12 for each cycle of the main drive shaft 22.

An adhesive applying means is also provided for each roll of banding material, as best shown in Figures 2 and 12, which is adapted to apply an adhesive to one end of the strip before the band is wrapped entirely around the pack. Each adhesive applying means includes an adhesive container or fountain 158 secured to a supporting bracket 159 positioned between the walls 21—21. A fountain roller 161 provided for each fountain is secured to a driven shaft 162 rotatably mounted in suitable bearings in the side walls 21—21, which shaft has a gear 163 at one end thereof. Said fountain roller rotates within the container and has a film of adhesive on the surface thereof. A transfer roller 164 is provided for each fountain and is rotatably mounted on a slightly flexible arm 165, which arm is fixed to a rock shaft 166 mounted in suitable bearings in the side walls 21—21. Said transfer roller 164 is normally maintained in engagement with the fountain roll 161 by the action of a spring impelled rod member indicated at 167, which is adapted to exert a tension against a lever 168, secured to the rock shaft 166. An arm 169 is secured to the shaft 166, which arm is connected with one arm of a bell crank 171 by means of a link 172. Said bell crank is rotatably mounted on a stud 173, secured within one wall 21, and has a cam plate 174 secured to the other arm thereof, which has a cam edge projecting directly into the path of the Geneva disc actuating rollers 27—27. The cam edge on the cam plate 174 is adapted to be engaged twice during each revolution of the main drive shaft 22, which will thus rock the rock shaft 166 and swing the transfer roller twice to an adhesive applying position during this period.

Referring to Figures 1 and 12, a driving mechanism is there shown which provides the drive for the aforementioned cutter shaft 145, unwinding roller shaft 138 and fountain roller shaft 162. Said driving mechanism includes a main sprocket 175 secured to the main drive shaft 22, which sprocket is adapted to drive another smaller sprocket 176, by means of a chain 177. The driven sprocket 176 is rotatably mounted on a stud shaft 178, secured within one side wall 21, and has a gear 179 secured thereto, so that both the sprocket and gear will be driven together. Said gear 179 meshes directly with the cutter shaft gear 146 and with an idler gear 181, and said idler gear meshes with the unwinding roller gear 139 and the fountain roller gear 163, to thus provide the desired drive. The idler gear 181 is rotatably mounted on a stud 182, secured within one side wall 21.

From the foregoing description regarding the feeding and cutting of the banding material and adhesive applying means and from the illustration of same, as shown in Figure 12, it will be seen that after the banding material passes over the unwinding roller 138, it is guided downward in a substantially vertical direction into the path of an approaching pack and is cut by the rotary cutter member 144, just as the approaching pack engages said banding material. Two positions of the pack and banding strip are shown in Figure 12 to represent the action which takes place when the package and strip are advanced to the receiving clip while said clip is in its upper position on the block 149. One of said positions illustrates the condition just as a pack is being advanced against the strip toward the clip while the other position illustrates the condition after the pack is advanced within the clip, the strip of banding material having been drawn therewith, around the front edge of the pack and covering the bottom and the greater part of the top of the pack. One free end of the strip is shown lying over the extended end 157 of the strap 156.

The adhesive transfer roll is also shown in two positions, one in its normal position in engagement with the fountain roll in full lines and the other in an adhesive applying position against the upper lap of the banding strip, in dotted lines.

Following the banding operation further in Figure 12, the pack is also shown in its discharge position on the lower surface of the block, wherein the free end of the band is now shown as having covered the other end of the pack and said pack is now in a position to be ejected from the clip. Further along the pack is shown again after its ejection and the free end of the banding strip is shown as having been brought into engagement with the remaining uncovered portion of the pack and with the adhesive end of the strip.

Figure 10:
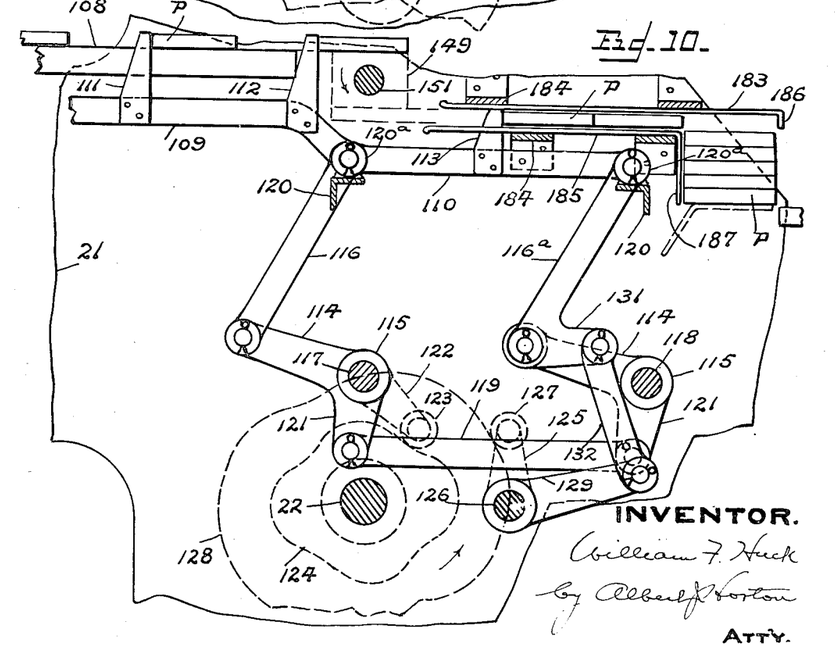
Figure 10 is a view similar to Figure 9 showing the pusher fingers as having advanced one pack to the pack receiving block and having discharged one therefrom.

In this same connection, reference is also made to Figure 10 in which the pusher bars 109 are shown in an advancing position wherein the finger 111 is shown as having advanced the one pack forward, the finger 112 as having advanced another pack to the clip and the ejector finger 113 on the offset portion of the bar as having ejected a pack from a clip on the lower surface of the block 149.

Figure 9:
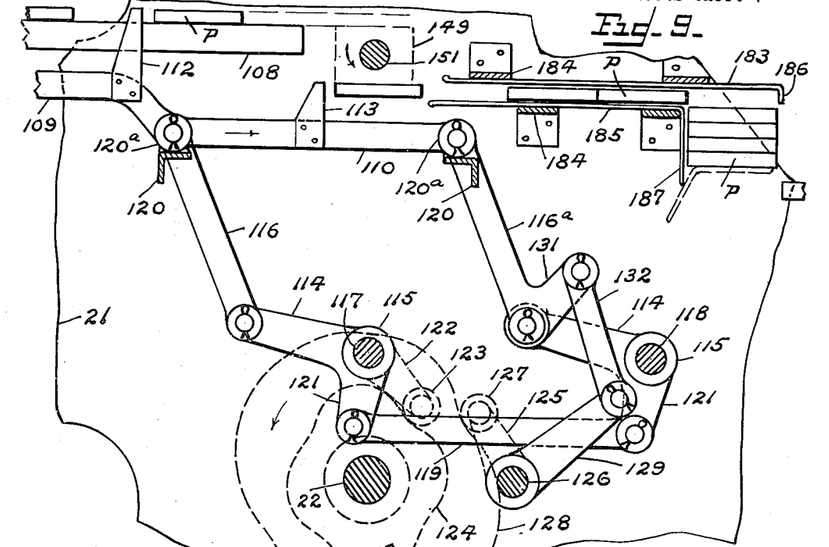
Figure 9 is a fragmentary detail view with parts broken away showing one of the pack advancing or pusher members in a position wherein it is about to advance one pack to a pack receiving block and discharge one pack from said block.

Referring further to Figure 10, also Figure 9, and particularly to the pack receiving guides or final band sealing members, the said guides comprise an upper strap 183 suitably suspended from cross bars 184 mounted between the side walls 21—21 and a lower strap 185 similarly supported.

After advancing a predetermined distance through said guide straps 183 and 185, the packs meet an open end which is provided by the down turned portions 186 and 187 of the upper and lower guide straps respectively, whereupon they are released and are permitted to engage the surface of a descending elevator platform or the surface of a pack or packs which had been previously released and deposited thereon.

In order to bring the pack receiving clips into proper alignment with the path of travel of an approaching pack on the tracks 108 and with the guides 183—183 in the pack discharging position, means is provided to lock the block supporting shaft 151 when the desired clip aligning positions are reached and to release said lock when the shaft 151 is to be rotated. Said means includes a disc 191 secured to the block supporting shaft 151, which disc has two oppositely disposed slots 192—192 in the periphery thereof. One arm of a bell crank 193, mounted on a stud 194 in the side wall 21, is connected to one arm of a bell crank 195 by means of a link 190, Figure 2, said bell crank being mounted on a stud 197, also secured to the side wall 21. A cam plate 198, secured to the other arm of the bell crank 195, is adapted to be engaged and rocked by one of the Geneva actuating rollers 27—27 on the arms 28—28, the action of which will rock the bell cranks 195 and 193. A roller 196, mounted on one arm of the bell crank 193, is adapted to be forced into engagement with one of the slots 192 in the disc 191, after said disc is rotated, by means of a spring biased connection indicated at 201 which cooperates with the bell crank 193.

The action of the disc locking mechanism is such that the spring biased connection is normally active to force the roller 196 against the periphery of the disc 191 or into a slot 192 to lock the disc 191 and shaft in a fixed position while the pusher bar 109 is advancing a pack into a clip in a receiving position and ejecting a pack from the clip which is in the discharge position. At the end of the advancing stroke of the pusher 109, the roller 27 will engage the cam plate 198 to rock the bell cranks 193—195 and momentarily release the roller 196 from a slot 192, after which the said roller 196 will again be forced against the periphery of the disc 191 to be ready to engage an approaching slot 192 and again lock said disc.

It will be understood that the invention may be embodied in other specific forms without departing from the spirit or essential attributes thereof, and it is therefore desired that the present embodiment be considered in all respects as illustrative and not restrictive, reference being had to the claims rather than to the foregoing description to indicate the scope of the invention.

What I claim is:

1. In a banding machine, means for receiving packs of cut products in side by side relation, means for rearranging said packs in relatively leading and following relation, and means for applying and securing a band to each of said packs.

2. In a banding machine, means for receiving one row of packs of cut products in a side by side relation, banding mechanism, means for advancing said packs toward the banding mechanism and rearranging same while advancing into two rows in a leading and following relation, and other means for further advancing said packs to the banding mechanism.

3. In a banding machine, means for receiving one transverse row of packs of cut products in a side by side relation, banding mechanism, means for advancing and depositing said packs at a position intermediate the banding mechanism at the receiving position and rearranging same into two transverse rows one row following the other, and other means to advance same from the deposited position to the banding mechanism.

4. In a banding machine, means for receiving packs of cut products in a side by side relation, banding mechanism arranged to provide a band for one-half the number of packs in the receiving position, means for advancing said packs and arranging same into two rows, a leading row and a following row, and other means to advance each of said rows to the banding mechanism.

5. In a banding mechanism, gripper members for receiving one transverse row of packs of cut products in a side by side relation, means to advance said gripper members and arrange same while advancing into two rows in a leading and following relation, other means to change the position of the packs to bring the packs of one row substantially into alignment with the packs of the other rows, and means to apply a band to each of said packs and secure same.

6. In a banding machine, gripper members arranged substantially in alignment, each adapted to receive one transverse row of packs of cut products in a side by side relation, two transversely disposed supporting members each adapted to support an equal number of said gripper members, means to advance said supporting members simultaneously at different speeds, to thereby separate the gripper members into two transverse rows, means for actuating each gripper member to move the packs into substantial longitudinal alignment, and means to apply a band to each of said packs and secure same.

7. In a banding machine, gripper members arranged in substantial alignment each adapted to receive a pack of cut products arranged in side by side relation, two gripper supporting members each adapted to support an equal number of said gripper members, means to advance said supporting members a predetermined distance at different speeds to thereby separate the gripper members into two transverse rows, means for actuating said gripper members to move the packs into substantial longitudinal alignment, other means to further advance said packs at the completion of the forward movement of the gripper supports, and means cooperating with said latter advancing movement to apply a band to each of the packs and secure same.

8. In a banding machine, gripper members each adapted to receive a pack of cut products arranged in side by side relation, said gripper members comprising vertically disposed members having yieldable gripper pads mounted thereon, two gripper supporting members each adapted to support a number of alternately arranged gripper members in substantial alignment, means to advance each of said gripper supporting members simultaneously at different speeds to thereby cause one row of alternate gripper members to advance further than the other row and provide two separate rows of packs in transverse alignment, means to partially rotate the vertically disposed members about their vertical axes to move the packs into substantially longitudinal alignment, means for further advancing the rows of packs, and means cooperating with said latter advancing means to apply and secure a band to each of the packs.

9. In a banding machine, gripper members each adapted to receive a pack of cut products arranged in side by side relation, said gripper members comprising vertically disposed members having yieldable pressure pads mounted thereon, means for simultaneously controlling the yieldable pressure of all of said pads, two gripper supporting members each adapted to support a number of alternately arranged gripper members in substantial alignment, a rocker arm mounted on each gripper member, bars connecting alternate rocker arms, means to advance each of said gripper supporting members simultaneously at different speeds to thereby cause one row of alternate gripper members to advance further than the other row and provide two separate rows of packs in transverse alignment, means to move said bars and rock said rocker arms to thereby move the packs into substantially longitudinal alignment, means for further advancing the rows of packs, and means cooperating with said latter advancing means to apply and secure a band to each of the packs.

10. In a banding machine, gripper members arranged in a single row transversely of the machines, each adapted to receive a pack of cut products arranged in side by side relation, means to move certain of said grippers in a row away from the row of remaining grippers while maintaining the grippers and packs of each row in transverse alignment, means for further moving each gripper to rearrange the packs in substantially longitudinal alignment and to deposit same in such relation, pusher members adapted to further advance said rows of packs, and means cooperating with said pusher members to apply and secure a band to each of the packs.

11. In a banding machine, gripper members arranged in a single row transversely of the machine, each adapted to receive a pack of cut products arranged in side by side relation, means to move alternate grippers in a row away from the row of remaining grippers while maintaining the grippers and packs of each row in transverse alignment, means for further moving each gripper to rearrange the packs in substantially longitudinal alignment and to deposit same in such relation, pusher members, means to reciprocate said pusher members longitudinally to advance said rows of packs intermittently, and means cooperating with said pusher members to apply and secure a band to each of the packs.

12. In a banding machine, gripper members arranged in a single row transversely of the machine, each adapted to receive a pack of cut products arranged in side by side relation, means to move alternate grippers in a row away from the row of remaining grippers while maintaining the grippers and packs of each row in transverse alignment, means for further moving each gripper to swing each row of packs into an end to end relation and then in substantially longitudinal relation, means to release said grippers from the packs after reaching the latter position, reciprocating pusher members adapted to advance said rows of packs on their forward stroke and pass below said packs on their return stroke, and means cooperating with said pusher members to apply and secure a band to each of the packs.

13. In a post card pack banding machine, means for forwarding a plurality of packs of post cards arranged side by side including grippers arranged in a row transversely of the machine and adapted to grip the ends of the packs, means for simultaneously moving alternate grippers longitudinally of the machine at different speeds, whereby the packs are moved in two separate rows with one row advancing faster than the other, and means for rotating the grippers while moving to change the packs to an end to end position.

14. In a banding machine, a rotatable block member adapted to receive packs of cut products and banding material, pack receiving clips arranged thereon in a pack receiving and a pack discharging position, common means for simultaneously moving a pack into a clip in a receiving position and ejecting a pack from a clip in a discharge position, means for actuating said pack moving and ejecting means, means for presenting a strip of banding material between the pack and receiving clip, whereby said pack is partially wrapped upon entering the clip, means for partially rotating the block after receiving a pack to move the pack to a discharge position, and guide means to guide and complete the wrapping of the pack when ejected from the clip.

15. In a banding machine, a rotatable block member adapted to receive packs of cut products and banding material, pack receiving clips arranged thereon in a pack receiving and a pack discharging position, a pack supporting track in alignment with a clip when in a receiving position, a guide in alignment with a clip when in a discharge position, a reciprocating pusher member adapted to simultaneously move one pack into a clip in a receiving position and eject another pack from a clip in a discharge position, means for presenting a strip of banding material between the pack and receiving clip whereby said pack is partially wrapped upon entering the clip, an adhesive applying member adapted to apply adhesive to the upper surface of one end of the strip while in the receiving clip, means for partially rotating the block after receiving a pack to move the pack to a discharge position, and guide means adapted to complete the wrapping of the pack and secure the other end of the strip upon the adhesive end after the pack is ejected from the clip.

16. In a banding machine, a rotatable block member adapted to receive packs of cut products and banding material, pack receiving clips arranged thereon in a pack receiving and a pack discharging position, feed rollers and cutting members for feeding, cutting and presenting a strip of banding material between the pack and receiving clip, a reciprocating pusher member having a pusher finger thereon to engage and advance a pack and a portion of the banding strip into the receiving clip, means for partially rotating the block after receiving a pack, to move the pack to a discharge position, another pusher finger on said pusher member to eject the pack from the clip when in a discharge position, and guide means to complete the wrapping of the pack when ejected from the clip.

17. In a banding machine, a rotatable block member adapted to receive packs of cut products and banding material, two pack receiving clips arranged thereon on opposite sides of the block in a pack receiving and a pack discharging position, a pack supporting track in alignment with a clip when in a receiving position, a guide in alignment with a clip when in a discharge position, a reciprocating pusher member adapted to simultaneously move one pack into a clip in a receiving position and eject another pack from a clip in a discharge position, driven feed rollers located above and ahead of said rotatable block for presenting a strip of banding material between the pack and clip whereby said pack is partially wrapped upon entering the clip, a reciprocating adhesive applying roller adapted to apply adhesive to the upper surface of one end of the strip while in the receiving clip, means for partially rotating the block after receiving a pack to move the pack to a discharge position and further wrap same, and guide means adapted to complete the wrapping of the pack and secure the other end of the strip upon the adhesive end after the pack is ejected from the clip.

18. In a banding machine, a plurality of banding members each including banding strip feeding rollers and means to guide said strip in a substantially vertical direction, rotary cutters to cut said banding strips to the desired length, a rotatable block adapted to receive packs of cut products and having pack receiving clips on opposite sides thereof, tracks in alignment with one of said receiving clips, means to forward the packs to said receiving clips including gripper members adapted to move packs from a receiving position to said tracks and a reciprocating pusher member adapted to advance said packs along the tracks to engage a banding strip and move said strip with the pack into a block receiving clip, and partially wrap said packs, means to rotate said block to further wrap said pack and move the pack to a discharge position, a guide in alignment with the latter position of said pack, and means on said pusher member to move said pack from the clip to the guide to complete the wrapping of same.

19. In a banding machine, the combination of means for receiving a pack of products disposed horizontally, means to turn the pack about a vertical axis, means to feed the pack in a horizontal plane, means to receive and carry the pack about a horizontal axis into another horizontal plane, and means to remove the pack from said receiving means and to move it away therefrom in a horizontal plane.

20. In a banding machine, the combination of means for receiving a pack of products disposed in a horizontal plane, means to turn the pack of products about a vertical axis, and means to apply a band about the pack.

21. In a banding machine, a horizontally disposed track for supporting flatwise a pack of products to be banded, a rotatable carrier having a clip thereon to receive a pack from said track, a pack receiving guide, means to rotate said carrier to carry a pack from said track to said guide, a reciprocable member to simultaneously engage a pack on said track and a pack in a clip on said carrier to move the former into a clip on said carrier and the latter from a clip on said carrier into said guide, and means to reciprocate said member in one direction in one plane, and in the other direction in another plane parallel to the first.

22. In a banding machine, a rotatable carrier having a clip thereon to receive a pack of products having a band wrapped over its upper and lower surfaces and about one edge, an adhesive applicator adapted to engage and apply adhesive to one end of the band upon one of the surfaces of the pack while the pack is disposed in said clip, means to rotate said carrier to reverse the surfaces of the pack, and means to remove the pack from said clip and to fold the other end of said band about the other edge of the pack and upon the band end having adhesive thereon.

23. In a banding machine, a rotatable carrier having a holder to receive a pack of products, means to move a pack of products against a strip of banding material and with the latter into said holder to wrap the material about the pack with one end thereof upon a surface of the pack and the other end free, an adhesive applicator adapted to engage and apply adhesive to the end of said material disposed on the pack in said holder, means to rotate said carrier to reverse the pack, and means to remove the pack from said holder and move it into a guide to wrap the free end of the material about the pack and dispose it upon the end having adhesive thereon.

24. In a banding machine for products in packs, means to move a pack of products against a strip of banding material, a pack holder to receive the pack of products and to wrap the banding material about one edge and two sides of the pack as the same are received therein, means to apply adhesive to one end of the strip of material on one side of the pack while it is in said holder, means to turn said holder to reverse the position of the pack, and means to move said reversed pack out of said holder and into a pack guiding means, said pack guiding means being arranged to complete the wrapping of the material about the pack and to press the other end of the same upon the end having adhesive thereon.

25. In a machine for wrapping a band about a pack of products, a rotatable pack carrying member adapted to receive a pack from a position in one plane with an end of the band material exposed on one surface of the pack, an adhesive applying member adapted to engage the exposed end of the band material while the pack is so disposed in said pack carrying member, means to actuate said pack carrying member to turn the pack over into a position in another plane parallel to the first, means to receive the pack from said carrying member and to wrap the other end of the band material about the pack and dispose it upon the end having the adhesive thereon, and common means to move the pack into said carrying member in its first position and to move the pack out of said carrying member in its other position and into said wrapping and receiving means.

26. In a machine for wrapping a band of material about a pack of products, means to move a pack of products in one direction against a strip of band material, means to receive the pack and the strip of band material with one end of the band material disposed upon the upper side of the pack and a portion thereof wrapped about an edge and the other side thereof, with the other end of the band material hanging freely therefrom upon continuation of the movement of the pack by said pack moving means, and means to move the pack receiving means in a series of directions, first, reverse to the direction of the aforesaid movement of the pack, then downwardly, and then in the same direction, to turn the pack upside down with the side of the pack having the end of the band thereon beneath the pack, said pack moving means being operable to remove the pack from said pack receiving means and into a guide member to dispose the free end of the band material upon the other end thereof.

27. In a machine for wrapping a band of material about a pack of products, means to move a pack of products in one direction against a strip of band material, means to receive the pack and the strip of band material with one end of the band material disposed upon the upper side of the pack and a portion thereof wrapped about an edge and the other side thereof, with the other end of the band material hanging freely therefrom upon continuation of the movement of the pack by said pack moving means, means to apply adhesive to the end of the band material on the upper side of the pack, and means to move the pack receiving means in a series of directions, first, reverse to the direction of the aforesaid movement of the pack, then downwardly, and then in the same direction, to turn the pack upside down with the side of the pack having the adhesive covered end of the band thereon beneath the pack, said pack moving means being operable to remove the pack from said pack receiving means and into a guide member to dispose the free end of the band material upon the adhesive covered end thereof and to press the same together.

WILLIAM F. HUCK.